United States Patent
Tanaka et al.

(10) Patent No.: US 6,795,613 B2
(45) Date of Patent: Sep. 21, 2004

(54) OPTICAL FIBER COLLIMATOR AND OPTICAL FIBER COLLIMATOR ARRAY

(75) Inventors: Hiroyuki Tanaka, Osaka (JP); Takashi Fukuzawa, Osaka (JP); Toshiaki Anzaki, Osaka (JP); Kenji Mori, Osaka (JP)

(73) Assignee: Nippon Sheet Glass Co., Lt., Osaka (JP)

( * ) Notice: Subject to any disclaimer, the term of this patent is extended or adjusted under 35 U.S.C. 154(b) by 0 days.

(21) Appl. No.: 10/273,683

(22) Filed: Oct. 18, 2002

(65) Prior Publication Data

US 2003/0077036 A1 Apr. 24, 2003

(30) Foreign Application Priority Data

Oct. 18, 2001 (JP) ........................................ 2001-321230

(51) Int. Cl.[7] .................................................. G02B 6/32
(52) U.S. Cl. ............................. 385/34; 385/31; 385/33
(58) Field of Search ............................. 385/15, 24, 27, 385/34, 46–48, 60, 61, 65, 78, 31, 33, 79, 83

(56) References Cited

U.S. PATENT DOCUMENTS

| | | | |
|---|---|---|---|
| 5,706,371 A | * | 1/1998 | Pan .............................. 385/11 |
| 5,930,423 A | * | 7/1999 | Chen et al. .................... 385/49 |
| 6,040,944 A | * | 3/2000 | Pan et al. ..................... 359/590 |
| 6,168,319 B1 | * | 1/2001 | Francis ......................... 385/79 |
| 6,438,288 B1 | * | 8/2002 | Tehrani ........................ 385/27 |
| 6,519,392 B2 | * | 2/2003 | Im et al. ....................... 385/48 |
| 6,603,906 B2 | * | 8/2003 | Qin et al. ..................... 385/48 |
| 2003/0103726 A1 | * | 6/2003 | Mori et al. ................... 385/34 |

* cited by examiner

Primary Examiner—John D. Lee
Assistant Examiner—Jennifer Doan
(74) Attorney, Agent, or Firm—Fish & Richardson P.C.

(57) ABSTRACT

An optical fiber collimator which facilitates optical adjustment. The optical fiber collimator includes a gradient index rod lens, and an optical fiber optically connected to the rod lens. An anti-reflection film is formed on one end face of the rod lens. The anti-reflection film has a refractive index which continuously changes from a value substantially equal to that of a center refractive index of the rod lens to a value substantially equal to that of the refractive index of the optical fiber along a film thickness direction of the anti-reflection film. A refractive index matching medium having a refractive index substantially equal to that of the optical fiber bonds the anti-reflection film to the end face of the optical fiber.

15 Claims, 6 Drawing Sheets

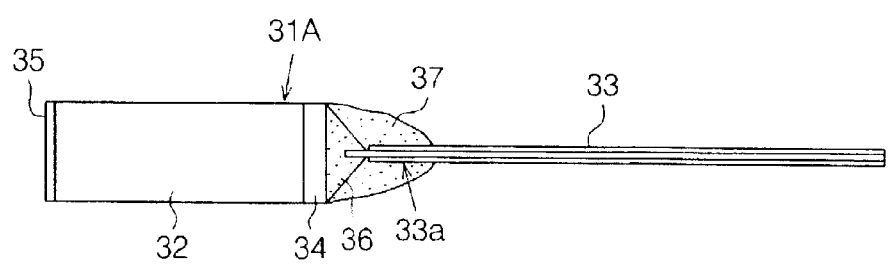
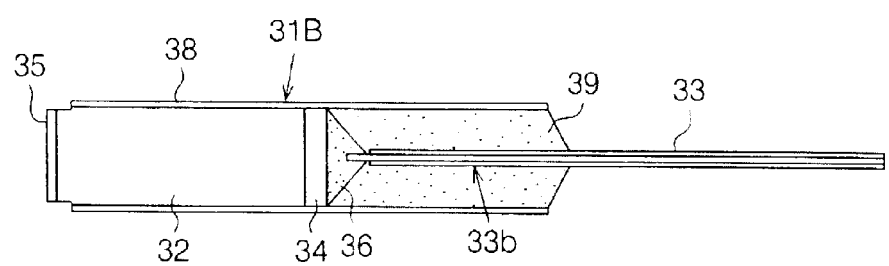
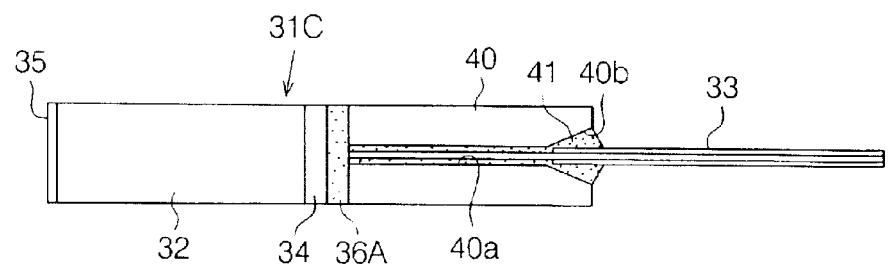

OPTICAL FIBER COLLIMATOR AND OPTICAL FIBER COLLIMATOR ARRAY

CROSS REFERENCE TO RELATED APPLICATIONS

Pursuant to 35 USC § 119, this application claims the benefit of Japan Patent Application No. 2001-321230 filed Oct. 18, 2001.

BACKGROUND OF THE INVENTION

The present invention relates to an optical fiber collimator and an optical fiber collimator array in which a gradient index rod lens is used.

An optical collimator device includes first and second optical fiber collimators. The first optical fiber collimator converts a light emitted from an optical fiber into a parallel light. The second optical fiber collimator converges the parallel light into a collimator lens and couples the light to an optical fiber. The first optical fiber collimator will hereinafter be referred to as an optical fiber collimator on an incidence side, and the second optical fiber collimator will be referred to as an optical fiber collimator on a reception side. In general, the collimators on the incidence and reception sides have substantially the same structure.

Optical function devices such as an optical filter, optical isolator, and optical switch are inserted between two collimator lenses of the optical collimator device. The optical collimator device exerts a predetermined action onto the light propagated through the optical fiber on the incidence side by the optical function device, and subsequently couples the light to the optical fiber of the optical fiber collimator on the reception side.

FIG. 1 is a schematic constitution diagram of an optical fiber collimator 20 for use in a conventional optical collimator device. The optical fiber collimator 20 includes a gradient index rod lens 21, single mode optical fiber 22, capillary 23 which holds the optical fiber 22, and glass tube 24 which holds the capillary 23 and rod lens 21. Anti-reflection films 25, 26 are formed on both end faces of the rod lens 21, and an anti-reflection film 27 is also formed on the end face (single mode fiber (SMF) end face) of the optical fiber 22. The anti-reflection films 25 to 27 are usually dielectric multilayered films.

The anti-reflection films 25 to 27 prevent the incident light from the optical fiber 22 from being reflected and returned to a light source side. Moreover, a loss of the incident light caused by the reflection is suppressed. In the optical fiber collimator 20, the end faces of the optical fiber 22 and rod lens 21 are obliquely polished. The oblique polishing can prevent the reflected light from the end faces of the optical fiber 22 and rod lens 21 from being incident upon the optical fiber 22 again and returning to the light source side. If the rod lens 21 is coupled to the optical fiber 22 without taking any anti-reflection countermeasure, the following disadvantage occurs.

FIG. 2 shows only a rod lens 21A and optical fiber 22A of an optical fiber collimator 20A which does not have any anti-reflection film. In the optical fiber collimator 20A, both end faces 21a, 21b of the rod lens 21A are flat surfaces vertical to an optical axis, and the anti-reflection films are not formed on the end faces 21a, 21b. The SMF end face of the optical fiber 22A is a flat surface vertical to a core center axis, and the anti-reflection film is not formed also on the SMF end face.

In the optical fiber collimator 20A not subjected to the anti-reflection countermeasure, the reflection by each of the SMF end face and the end faces 21a, 21b of the rod lens 21A occurs substantially by 5%, and a loss of about 14% is generated as a whole. As a result, a coupling efficiency is −0.6 dB or less, and standard required characteristics such as a characteristic of −0.2 dB or more cannot be obtained.

The reflected light on the SMF end face and the reflected lights on the end faces 21a, 21b of the rod lens 21A are directly incident as return lights upon the optical fiber 22A again, and return to the light source side. Therefore, the anti-reflection countermeasure is required as in the optical fiber collimator 20 shown in FIG. 1. As shown in FIGS. 1 and 3, anti-reflection films 25, 26, 27 each having a reflectance of 0.2% or less are disposed on the both end faces of the rode lens 21 and the SMF end face of the optical fiber 22. The anti-reflection films 25, 26, 27 reduce the whole reflection loss to about 0.6%. Furthermore, the SMF end face and one end face of the rod lens 21 are obliquely polished. By the anti-reflection countermeasure of the oblique polishing, the reflected return lights from the SMF end face and the both end faces of the rod lens 21 are remarkably reduced.

However, the conventional optical fiber collimator 20 shown in FIG. 1 has the following problems.

(A) It is necessary to form the anti-reflection film 27 on the SMF end face of the optical fiber 22, but it is not easy to form the anti-reflection film 27 on the SMF end face which has a long dimension and small diameter.

(B) The oblique polishing of at least one end face of the rod lens 21 and the SMF end face of the optical fiber 22 requires long time, causes the reduction of a yield, and deteriorates productivity.

(C) Since the capillary 23 and glass tube 24 are required, the number of components and the number of assembly processes increase, and cost increases.

(D) To perform an optical adjustment so that the optical axis of the rod lens 21 agrees with a core center of the optical fiber 22, it is necessary to consider the deflection of the light by the light reflection in the SMF end face of the optical fiber 22 and one end face of the rod lens 21 as the oblique surfaces. Therefore, the optical adjustment becomes complicated.

SUMMARY OF THE INVENTION

An object of the present invention is to provide an optical fiber collimator and optical fiber collimator array in which manufacturing and assembling processes are simplified, productivity is enhanced, cost is reduced, and optical adjustment is facilitated.

According to one aspect of the present invention, there is provided an optical fiber collimator including a gradient index rod lens and an optical fiber optically connected to the rod lens. The optical fiber collimator includes an anti-reflection film formed on one end face of the rod lens. The anti-reflection film has a refractive index which continuously changes from a value substantially equal to a center refractive index of the rod lens to a value substantially equal to the refractive index of the optical fiber along a film thickness direction of the anti-reflection film. The optical fiber collimator further includes a refractive index matching medium which has a refractive index substantially equal to that of the optical fiber and which couples the anti-reflection film to an end face of the optical fiber.

According to another aspect of the present invention, there is provided a method for manufacturing an optical fiber collimator including a gradient index rod lens and an optical fiber optically connected to the rod lens. The method comprises a step of forming an anti-reflection film on one end face of the rod lens. The anti-reflection film has a refractive index which continuously changes from a value substantially equal to a center refractive index of the rod lens to a value substantially equal to the refractive index of the optical fiber along a film thickness direction of the anti-reflection film. The method further comprises a step of using a refractive index matching medium having a refractive index substantially equal to that of the optical fiber to bond the anti-reflection film to the end face of the optical fiber.

According to further aspect of the present invention, there is provided an optical fiber collimator array comprising a plurality of optical fiber collimators. Each of the plurality of optical fiber collimators includes a gradient index rod lens and an optical fiber optically connected to the rod lens. Each optical fiber collimator includes an anti-reflection film formed on one end face of the rod lens. The anti-reflection film has a refractive index which continuously changes from a value substantially equal to a center refractive index of the rod lens to a value substantially equal to the refractive index of the optical fiber along a film thickness direction of the anti-reflection film. The optical fiber collimator further includes a refractive index matching medium which has a refractive index substantially equal to that of the optical fiber and which bonds the anti-reflection film to an end face of the optical fiber.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 6 is a schematic longitudinal sectional view of the optical fiber collimator according to a second embodiment of the present invention;

FIG. 7 is a schematic longitudinal sectional view of the optical fiber collimator according to a third embodiment of the present invention;

FIG. 8 is a schematic longitudinal sectional view of the optical fiber collimator according to a fourth embodiment of the present invention;

DETAILED DESCRIPTION OF THE PREFERRED EMBODIMENTS

Figure 1:
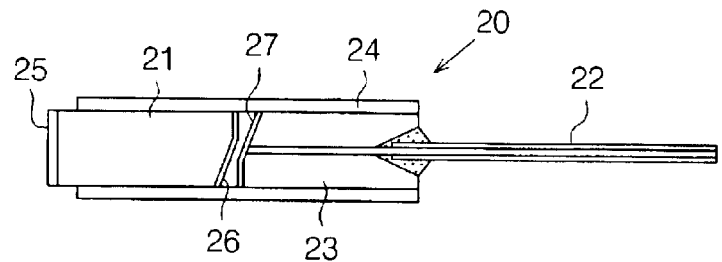
FIG. 1 is a schematic longitudinal sectional view of a conventional optical fiber collimator.
Figure 2:
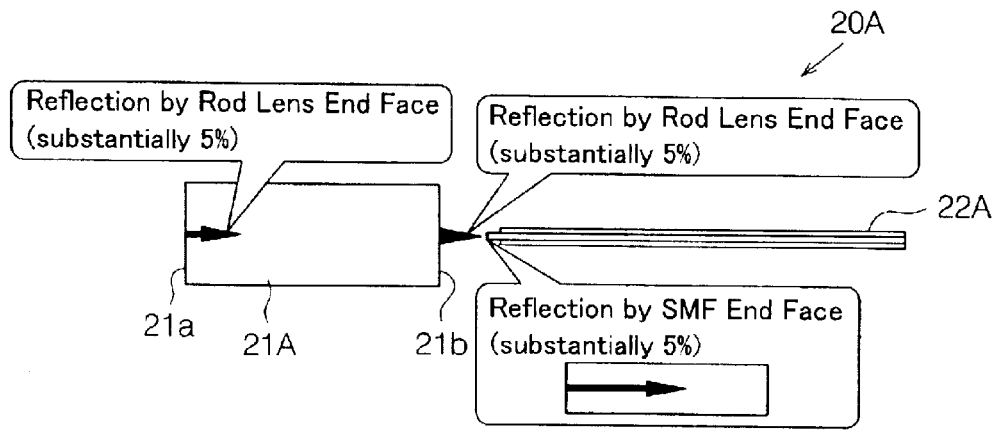
FIG. 2 is an explanatory view of the conventional optical fiber collimator which does not include an anti-reflection film.
Figure 3:
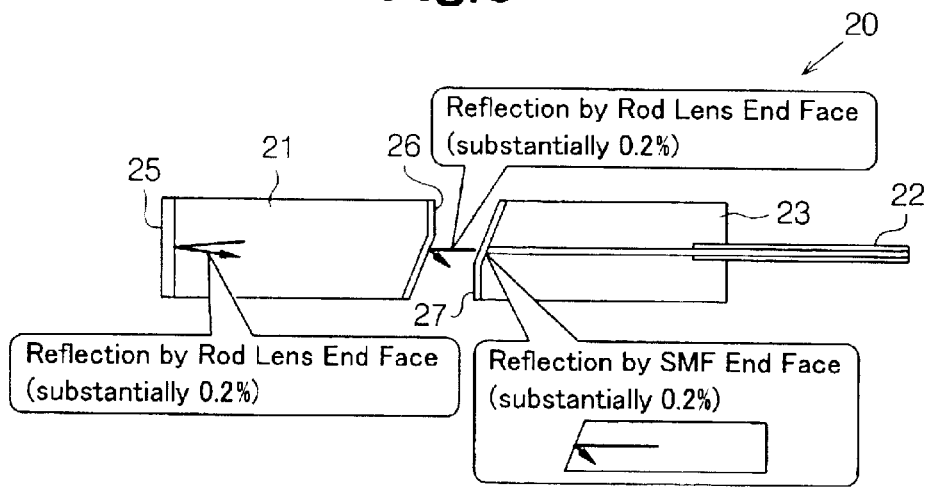
FIG. 3 is an explanatory view showing that the anti-reflection film is formed on the optical fiber collimator of FIG. 2.

In the drawings, like numerals are used for like elements throughout.

Figure 4:
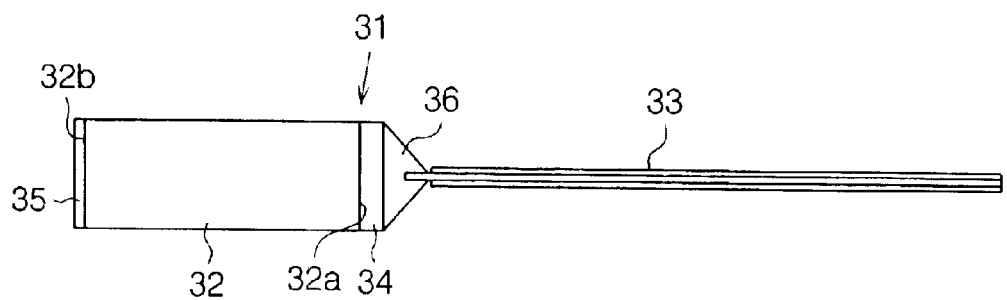
FIG. 4 is a schematic longitudinal sectional view of an optical fiber collimator according to a first embodiment of the present invention.
Figure 5:
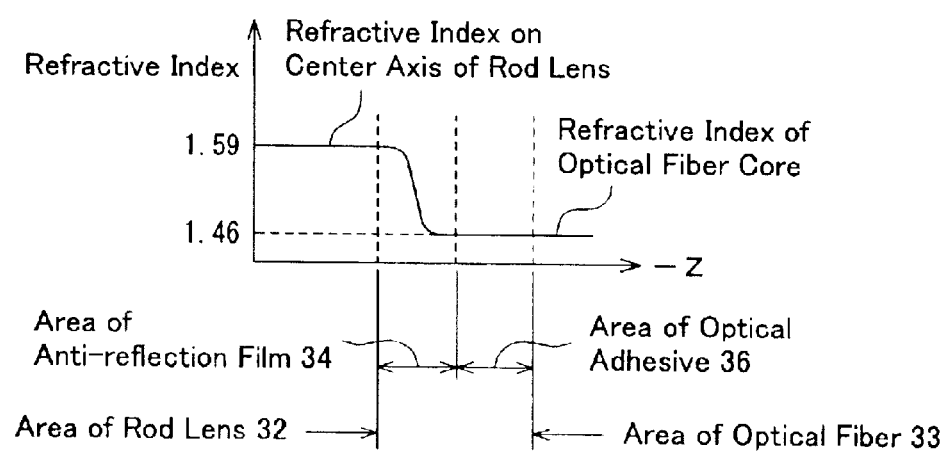
FIG. 5 is a graph showing a refractive index of each part of the optical fiber collimator of FIG. 4.

An optical fiber collimator 31 according to a first embodiment of the present invention will be described with reference to FIGS. 4 and 5.

The optical fiber collimator 31 includes a gradient index rod lens 32 and optical fiber 33, and converts an incident light from the optical fiber 33 into a parallel light by the rod lens 32. An anti-reflection film (layer) 34 is formed on one end face 32a of the gradient index rod lens (hereinafter referred to simply as the rod lens) 32, and an anti-reflection film 35 is formed on another end face 32b.

The anti-reflection film 34 is the dielectric multilayered film, and is formed so as to have a refractive index distribution in which a refractive index continuously changes with respect to a film thickness direction. In detail, as shown in FIG. 5, the refractive index of the anti-reflection film 34 continuously changes from a value substantially equal to that of the refractive index on the center axis of the rod lens 32 to a value substantially equal to that of the refractive index of a core of the optical fiber 33. For example, the anti-reflection film 34 is formed by several tens of layers of thin films. The anti-reflection film 35 formed on the other end face 32b is a usual dielectric multilayered film which has a single refractive index.

Here, a refractive index (center refractive index) n on a center axis of the rod lens 32 is, for example, 1.59 (n=1.59). The refractive index n of the core of the optical fiber 33 (hereinafter referred to simply as the refractive index of the optical fiber 33) is, for example, 1.46 (n=1.46). The refractive index distribution of the anti-reflection film 34 is represented, for example, by a monotonous linear equation, high-order polynomial equation such as quintic, or tanh function (hyperbolic function) in which the refractive index continuously changes with respect to the film thickness direction.

The end face of the optical fiber 33 is bonded to the surface of the anti-reflection film 34 on the incidence side by a conical optical adhesive 36. The optical adhesive 36 is a refractive index matching medium which has the refractive index n (n=1.46) substantially equal to the refractive index of the optical fiber 33, and is, for example, an ultraviolet setting type optical adhesive.

The optical fiber collimator 31 of the first embodiment has the following advantages.

(1) It is unnecessary to form the anti-reflection film on the end face of the optical fiber 33. Therefore, the manufacturing process is simplified.

(2) There is substantially no refractive index difference from the optical adhesive 36 in the end face of the optical fiber 33. Therefore, the reflected return light from the end face of the optical fiber 33 is substantially equal to zero. There is substantially no refractive index difference from the anti-reflection film 34 in one end face 32a of the rod lens 32. Therefore, the reflected return light from one end face 32a of the rod lens 32 is also equal to substantially zero. In other words, an optical system theoretically having zero reflection is formed in the vicinity of the incidence portion of light beams. Therefore, the end face of the optical fiber and one end face 32a of the rod lens do not have to be obliquely polished. As a result, the manufacturing process is simplified, and productivity is enhanced.

(3) When the end face of the optical fiber 33 is simply bonded to the anti-reflection film 34 by the optical adhesive 36, the rod lens 32 can easily be coupled to the optical fiber 33.

(4) When the end face of the optical fiber 33 is bonded to the anti-reflection film 34 by the optical adhesive 36, the rod lens 32 is coupled to the optical fiber 33. Therefore, the conventional capillary can be omitted, the number of components is reduced, and the assembly process is simplified. As a result, the productivity is enhanced, and the cost is reduced.

(5) The end face of the optical fiber 33 and one end face 32a of the rod lens 32 are flat surfaces vertical to the optical axis. Therefore, the deflection of the light beam by the reflected light from the oblique surface does not have to be considered, and optical adjustment is facilitated. As a result, an operation time is reduced, the productivity is enhanced, and the cost can be reduced.

An optical fiber collimator 31A according to a second embodiment of the present invention will next be described with reference to FIG. 6. As shown in FIG. 6, in the optical fiber collimator 31A, the optical adhesive 36, and a bonded portion vicinity 33a of the optical fiber 33 and optical adhesive 36 are bonded by a structural adhesive (bond member) 37 for reinforcement. Another constitution is substantially the same as that of the optical fiber collimator 31 of the first embodiment.

That is, the potting is performed using the structural adhesive 37 so that the conical surface of the optical adhesive 36 and the end face vicinity 33a of the optical fiber 33 are coated, and thereby the optical adhesive 36 is bonded to the end face vicinity 33a of the optical fiber 33 by the structural adhesive 37. Therefore, in the optical fiber collimator 31A of the second embodiment, the structural adhesive 37 enhances rigidity of the bonded portion of the optical adhesive 36 and optical fiber 33.

An optical fiber collimator 31B according to a third embodiment of the present invention will next be described with reference to FIG. 7. As shown in FIG. 7, the optical fiber collimator 31B includes a cylindrical case 38. The cylindrical case 38 fits into the outer periphery of the rod lens 32 to form a space between the optical adhesive 36 and a portion 33b of the optical fiber. Into the space in the cylindrical case 38, an adhesive for reinforcement 39 is filled. The adhesive for reinforcement 39 bonds the optical adhesive 36 and one portion 33b of the optical fiber 33 to the cylindrical case 38. The other constitution is substantially the same as that of the optical fiber collimator 31 of the first embodiment.

The optical fiber collimator 31B of the third embodiment has the following advantage.

The adhesive for reinforcement 39 filled into the space in the cylindrical case 38 bonds the optical adhesive 36 and one portion 33b of the optical fiber 33 to the case 38 fit in the outer periphery of the rod lens 32. Therefore, the whole rigidity of the optical fiber collimator 31B is remarkably enhanced.

An optical fiber collimator 31C according to a fourth embodiment of the present invention will next be described with reference to FIG. 8. As shown in FIG. 8, the optical fiber collimator 31C includes a capillary 40 which is integrally formed with the optical fiber 33 to hold the optical fiber 33. The end face of the capillary 40 (left-side end face in FIG. 8) is bonded together with the end face of the optical fiber 33 to the anti-reflection film 34 by an optical adhesive 36A as the refractive index matching medium. The optical adhesive 36A is formed in a disc shape similarly as the anti-reflection film 34 formed in the disc shape.

The optical fiber 33 is passed through an optical fiber insertion hole 40a of the capillary 40. An opening 40b having a bore diameter larger than that of the insertion hole 40a is formed in the end face of the insertion hole 40a (right-side end face in FIG. 8). By an adhesive (fixing member) 41 filled into the insertion hole 40a through the opening 40b, the optical fiber 33 is formed integrally with the capillary 40. The other constitution is substantially the same as that of the optical fiber collimator 31 of the first embodiment.

The optical fiber collimator 31C of the fourth embodiment has the following advantage.

The end face of the capillary 40 which holds the optical fiber 33 is bonded together with the end face of the optical fiber 33 to the anti-reflection film 34 by the optical adhesive 36A. Therefore, the rigidity of the bonded portion of the anti-reflection film 34 and the optical fiber 33 is enhanced.

Figure 9:
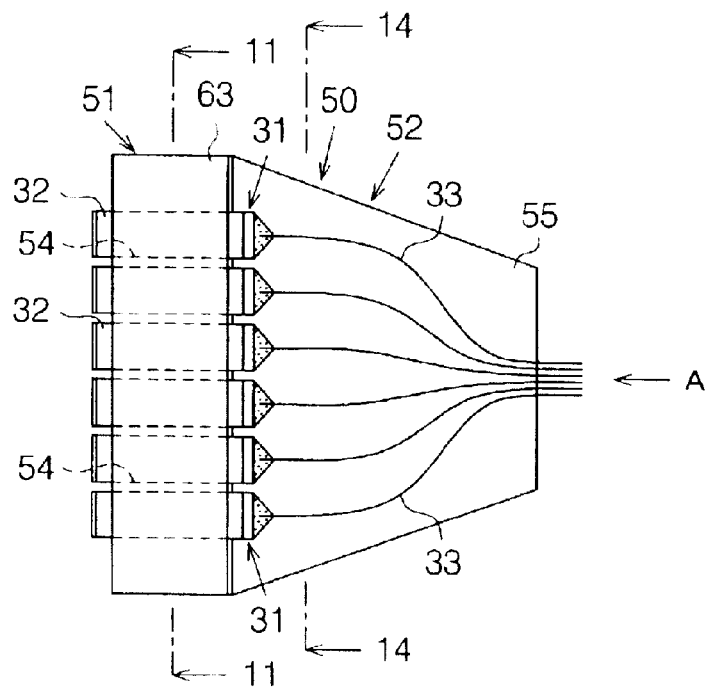
FIG. 9 is a schematic plan view of an optical fiber collimator array according to a fifth embodiment of the present invention.
Figure 10:
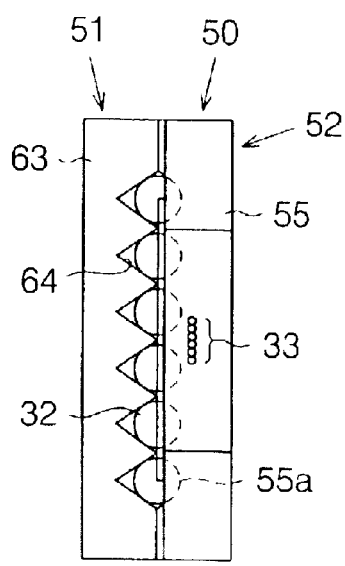
FIG. 10 is an A arrow diagram of FIG. 9.
Figure 11:
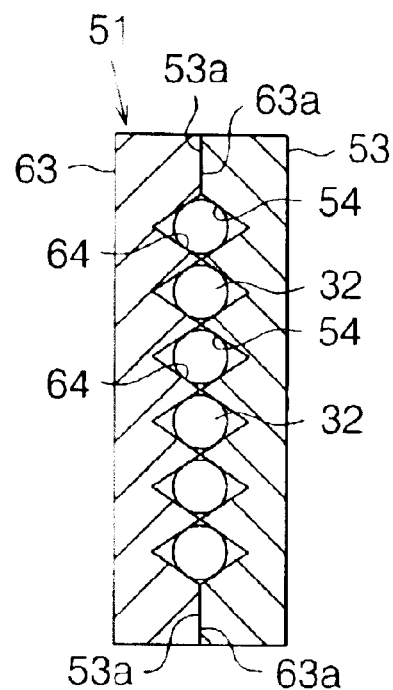
FIG. 11 is a sectional view taken along line 11—11 of FIG. 9.
Figure 12:
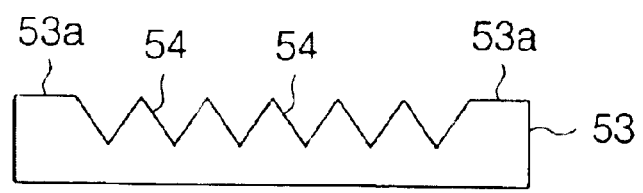
FIG. 12 is a side view showing a substrate of a rod lens holding portion of the optical fiber collimator array of FIG. 9.

An optical fiber collimator array 50 according to a fifth embodiment of the present invention will next be described with reference to FIGS. 9 to 13. FIG. 9 is a plan view of the array 50, FIG. 10 is an A arrow diagram of FIG. 9, and FIG. 11 is a sectional view taken along line 11—11 of FIG. 9. The optical fiber collimator array 50 of the fifth embodiment includes six optical fiber collimators 31 according to the first embodiment of FIG. 4.

The optical fiber collimator array 50 includes a rod lens holding portion 51 and optical fiber holding portion 52. As shown in FIGS. 9 and 10, the rod lens holding portion 51 holds the rod lenses 32 of six optical fiber collimators 31 in parallel to each other and at equal intervals. The optical fiber holding portion 52 holds six optical fibers 33 each connected to the corresponding rod lens 32.

As shown in FIG. 11, the rod lens holding portion 51 includes first and second substrates 53, 63 whose shapes are the same. The first and second substrates 53, 63 are formed, for example, of silicon, six first V grooves 54 are formed in the first substrate 53, and six second V grooves 64 are formed in the second substrate 63. Six first and second V grooves 54, 64 are formed in parallel with each other, at equal intervals, and in the same size.

A width (length of the left to right direction in FIG. 9) of each substrate 53, 63 is smaller than a length of the rod lens 32 (see FIG. 9). Each of the rod lenses 32 of six optical fiber collimators 31 is laid in the corresponding groove of the six V grooves 54 of the first substrate 53 on a lower side. In this state, a bond surface 63a of the second substrate 63 on an upper side is brought together with and bonded to a bond surface 53a of the first substrate 53 on the lower side. Then, each of the rod lenses 32 is centered and held by the corresponding pair of six first and second V grooves 54, 64 of the first and second substrates 53, 63 (see FIG. 11). In the state where each of the rod lenses 32 is centered and held by the corresponding pair of the V grooves 54, 64 of the first and second substrates 53, 63, the six rod lenses 32 are integrally disposed.

The optical fiber holding portion 52 includes a fan-shaped optical fiber holding substrate 55 which has a thickness substantially equal to that of the first substrate 53. One end face of the holding substrate 55 (left-side end face in FIG. 9) is bonded to one end face of the first substrate 53 (right-side end face in FIG. 9). When six optical fibers 33 are bonded/fixed to the surface of the optical fiber holding substrate 55, six optical fibers 33 are held by the holding substrate 55, and protected by the adhesive.

Six indentations 55a for containing one end (end on a side on which the optical fiber 33 is connected) of each rod lens 32 are formed in the vicinity of the bonded portion with the first substrate 53 of the optical fiber holding portion 52. The rod lenses 32 are positioned only by six first and second V grooves 54, 64 of the first and second substrates 53, 63. Six optical fibers 33 are collected and extended from the other end face of the optical fiber holding substrate 55.

A material of the holding substrate 55 is not limited as long as the rigidity of an optical component can be maintained, and examples of the material include glass, engineering plastic, and metal. As the adhesive for use in the fifth embodiment, a structural adhesive having a certain degree of elasticity is used. Examples of the structural adhesive include urethane-based, silicon-based, and epoxy-based adhesives.

The optical fiber collimator array 50 of the fifth embodiment has the following advantages.

(1) Each of the rod lenses 32 is laid in the corresponding groove of the V grooves 54 of the first substrate 53, and the upper second substrate 63 is bonded to the first substrate 53. Then, each of the rod lenses 32 is centered and held by the corresponding pair of the V grooves 54, 64, so that the rod lenses 32 are arranged at equal intervals and the optical axes of the lenses extend in parallel with one another. Therefore, it is unnecessary to perform a troublesome adjusting/centering operation with respect to each optical fiber collimator 31. As a result, the assembly process of the optical fiber collimator array 50 is simplified, the productivity is enhanced, and the cost can be reduced.

(2) Each of the rod lenses 32 is centered and held by the corresponding pair of the six first and second V grooves 54, 64. Therefore, a deflection angle (see FIG. 13) of an outgoing light from each rod lens 32 can be reduced down to a minimum level.

(3) The optical fiber collimator array 50 is manufactured by disposing each rod lens 32 between the V grooves 54, 64, and bonding the substrates 53, 63 to each other. Therefore, it is easy to manufacture the optical fiber collimator array 50.

It should be apparent to those skilled in the art that the present invention may be embodied in many other specific forms without departing from the spirit or scope of the invention. Particularly, it should be understood that the invention may be embodied in the following forms.

In each embodiment, a glass material formed by a sol-gel method may also be used as the refractive index matching medium.

Figure 13:
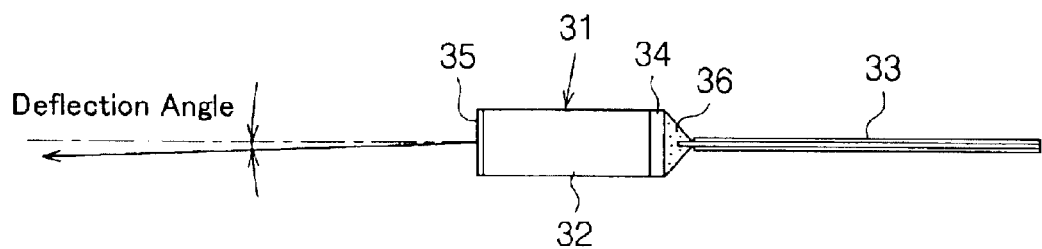
FIG. 13 is an explanatory view of a deflection angle of an outgoing light of each optical fiber collimator of the optical fiber collimator array of FIG. 9.

In each embodiment, when the reflected return light from the other end face 32b of the rod lens 32 raises a problem, the deflection angle of the outgoing light shown in FIG. 13 may be set to an appropriate magnitude, or only the other end face 32b may be obliquely polished.

In the fifth embodiment, the optical fiber collimator array 50 does not have to include the optical fiber holding portion 52.

In the fifth embodiment, the second substrate 63 may be omitted. In this case, each of the rod lenses 32 is laid in and bonded to the corresponding groove of the six first V grooves 54 of the first substrate 53.

In the fifth embodiment, the number of optical fiber collimators 31 is optional.

Figure 14:
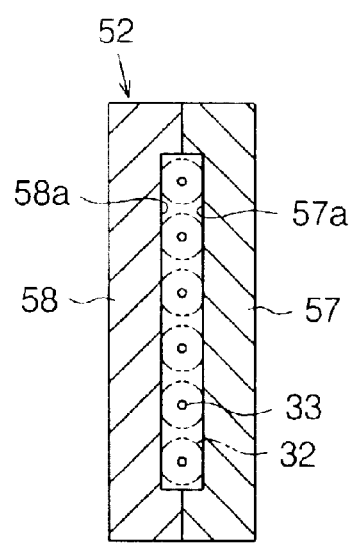
FIG. 14 is a schematic partial sectional view of a modification example of the optical fiber collimator array shown in FIG. 9.

In the fifth embodiment, for the optical fiber holding portion 52, for example, as shown in FIG. 14, first and second optical fiber holding substrates 57, 58 are bonded to each other, so that one end of each rod lens 32 and six optical fibers 33 may be contained in the first and second optical fiber holding substrates 57, 58. FIG. 14 corresponds to a sectional view taken along line 14—14 of FIG. 9.

First and second concave portions 57a, 58a are formed in the first and second optical fiber holding substrates 57, 58 respectively, and one end of each rod lens 32 and six optical fibers 33 are contained in the first and second concave portions 57a, 58a. To fix the optical fibers 33, the first and second concave portions 57a, 58a are impregnated with the adhesive.

In the fifth embodiment, for the optical fiber holding portion 52, two half-divided cases including wall portions formed in peripheries of the cases are bonded to each other, so that one end of each rod lens 32 and six optical fibers 33 may be contained in the case. Six optical fibers 33 may also be fixed by the adhesive.

In the fifth embodiment, one end of each rod lens 32 may be prevented from projecting from the holding portion 51. In this case, it is unnecessary to dispose the indentation 55a for containing one end of each rod lens 32 in the optical fiber holding portion 52.

Therefore, the present examples and embodiments are to be considered as illustrative and not restrictive and the invention is not to be limited to the details given herein, but may be modified within the scope and equivalence of the appended claims.

What is claimed is:

1. An optical fiber collimator comprising:
    a gradient index type rod lens;
    an optical fiber optically connected to the rod lens;
    an anti-reflection film which is formed on one end face of the rod lens and has a refractive index, wherein the refractive index of the anti-reflection film continuously changes from a value substantially equal to that of a center refractive index of the rod lens to a value substantially equal to that of a refractive index of the optical fiber along a film thickness direction of the anti-reflection film; and
    a refractive index matching medium which has a refractive index substantially equal to that of the optical fiber and bonds the anti-reflection film to an end face of the optical fiber.

2. The optical fiber collimator according to claim 1, wherein the refractive index matching medium is an optical adhesive.

3. The optical fiber collimator according to claim 1, wherein the refractive index matching medium is a glass material formed by a sol-gel method.

4. The optical fiber collimator according to claim 1 further comprising a bond member which bonds the refractive index matching medium to an end face vicinity of the optical fiber.

5. The optical fiber collimator according to claim 1, further comprising:
    a cylindrical case in which the rod lens is contained and which forms a space between the refractive index matching medium and a part of the optical fiber; and
    a structural adhesive filled into the space in the case.

6. The optical fiber collimator according to claim 1, further comprising:
a capillary which is integrally formed with the optical fiber and holds the optical fiber,
wherein the refractive index matching medium bonds an end face of the capillary and the end face of the capillary and the end face of the optical fiber to the anti-reflection film.

7. The optical fiber collimator according to claim 6, wherein the capillary includes:
an insertion hole for inserting the optical fiber; and
an opening which is formed in one end of the insertion hole and has a bore diameter larger than that of the insertion hole, and
the optical fiber collimator further comprising:
a fixing member which is filled into the opening and insertion hole to fix the optical fiber.

8. The optical fiber collimator according to claim 1, wherein the end face of the optical fiber is a flat surface vertical to an optical axis of the optical fiber, and one end face of the rod lens is a flat surface vertical to the optical axis of the rod lens.

9. The optical fiber collimator according to claim 1, wherein the anti-reflection film is a dielectric multilayered film.

10. A method for manufacturing an optical fiber collimator including a gradient index rod lens and an optical fiber optically connected to the rod lens, the method comprising the steps of:
forming an anti-reflection film on one end face of the rod lens, wherein the anti-reflection film has a refractive index which continuously changes from a value substantially equal to that of a center refractive index of the rod lens to a value substantially equal to that of a refractive index of the optical fiber along a film thickness direction of the anti-reflection film; and
using a refractive index matching medium having a refractive index substantially equal to that of the optical fiber to bond the anti-reflection film to the end face of the optical fiber.

11. The method according to claim 10, further comprising the steps of: using a bond member to bond the refractive index matching medium to an end face vicinity of the optical fiber.

12. An optical fiber collimator array comprising:
a plurality of optical fiber collimators, each of the plurality of optical fiber collimators including:
a gradient index rod lens;
an optical fiber optically connected to the rod lens;
an anti-reflection film which is formed on one end face of the rod lens and has a refractive index, wherein the refractive index of the anti-reflection film continuously changes from a value substantially equal to that of a center refractive index of the rod lens to a value substantially equal to that of the a refractive index of the optical fiber along a film thickness direction of the anti-reflection film; and
a refractive index matching medium which has a refractive index substantially equal to that of the optical fiber and bonds the anti-reflection film to an end face of the optical fiber.

13. The optical fiber collimator array according to claim 12, further comprising:
a rod lens holding portion having a plurality of V grooves for holding a plurality of rod lenses,
wherein the plurality of V grooves are formed to hold the plurality of rod lenses so that the plurality of rod lenses are disposed at equal intervals and optical axes of the respective rod lenses extend in parallel with one another.

14. The optical fiber collimator array according to claim 13, wherein the rod lens holding portion includes:
a first substrate which has a plurality of first V grooves; and
a second substrate which is disposed opposite to the first substrate and has a plurality of second V grooves disposed opposite to the plurality of first V grooves,
wherein the first and second substrates are disposed so that the respective V grooves are faced to each other, and
each pair of the first and second V grooves holds the rod lens of the associated optical fiber collimator.

15. The optical fiber collimator array according to claim 12, further comprising:
a first optical fiber holding substrate which has a first concave portion; and
a second optical fiber holding substrate which is bonded to the first optical fiber holding substrate and includes a second concave portion disposed opposite to the first concave portion,
wherein the first and second concave portions contain one end of each rod lens and a plurality of optical fibers.

* * * * *

UNITED STATES PATENT AND TRADEMARK OFFICE
CERTIFICATE OF CORRECTION

PATENT NO. : 6,795,613 B2 Page 1 of 1
DATED : September 21, 2004
INVENTOR(S) : Hiroyuki Tanaka et al.

It is certified that error appears in the above-identified patent and that said Letters Patent is hereby corrected as shown below:

<u>Title page,</u>
Item [73], Assignee, "Lt." should read -- Ltd. --.

Signed and Sealed this

Third Day of May, 2005

JON W. DUDAS
*Director of the United States Patent and Trademark Office*